United States Patent
Blazey et al.

(10) Patent No.: US 6,177,118 B1
(45) Date of Patent: Jan. 23, 2001

(54) METHODS FOR PRODUCING CHEESE AND CHEESE PRODUCTS

(75) Inventors: Neil D. Blazey, Santa Rosa, CA (US); Stephen T. Dybing, Reading, PA (US); Ralph J. Knights; I-Lo Huang, both of Santa Rosa, CA (US)

(73) Assignee: New Zealand Milk Products (North America) Inc., Santa Rosa, CA (US)

(*) Notice: Under 35 U.S.C. 154(b), the term of this patent shall be extended for 0 days.

(21) Appl. No.: 09/435,494

(22) Filed: Nov. 6, 1999

Related U.S. Application Data

(60) Provisional application No. 60/107,359, filed on Nov. 6, 1998.

(51) Int. Cl.$^7$ .................................................. A23C 19/00
(52) U.S. Cl. .................... 426/582; 426/656; 426/657; 426/478; 426/490; 426/491; 426/130
(58) Field of Search ........................ 426/36, 39, 580, 426/582, 656, 657, 478, 490, 491, 130

(56) References Cited

U.S. PATENT DOCUMENTS

| | | | |
|---|---|---|---|
| 3,914,435 | 10/1975 | Maubois et al. | 426/40 |
| 4,018,752 | 4/1977 | Bühler et al. | 426/36 X |
| 4,057,655 | 11/1977 | Okada et al. | 426/583 |
| 4,066,791 | 1/1978 | Corbin, Jr. | 426/39 |
| 4,205,090 | 5/1980 | Maubois et al. | 426/40 |
| 4,268,528 * | 5/1981 | Montigny | 426/40 |
| 4,271,201 | 6/1981 | Stenne | 426/40 |
| 4,355,048 | 10/1982 | Schaap et al. | 426/40 |
| 4,361,588 | 11/1982 | Herz | 426/104 |
| 4,379,170 | 4/1983 | Hettinga et al. | 426/40 |
| 4,689,234 | 8/1987 | Ernstrom et al. | 426/38 |
| 4,713,254 | 12/1987 | Childs et al. | 426/582 |
| 4,820,530 * | 4/1989 | Moran et al. | 426/40 |
| 4,948,599 * | 8/1990 | Sagara et al. | 426/40 |
| 4,959,229 | 9/1990 | Reddy et al. | 426/39 |
| 4,965,078 | 10/1990 | Van Leeuwen et al. | 426/40 |
| 5,006,349 | 4/1991 | Dahlstrom et al. | 426/39 |
| 5,098,721 | 3/1992 | Kosikowski et al. | 426/34 |
| 5,130,148 | 7/1992 | Brown et al. | 426/39 |
| 5,334,398 | 8/1994 | Sueyasu et al. | 426/36 |
| 5,356,639 | 10/1994 | Jameson et al. | 426/40 |
| 5,554,397 | 9/1996 | Tanaka et al. | 426/36 |
| 5,831,079 | 11/1998 | Hanagata et al. | 536/124 |

FOREIGN PATENT DOCUMENTS

| | | |
|---|---|---|
| 0755630 * | 1/1997 | (EP) . |
| 4-360645 | 12/1992 | (JP) . |
| 00/27214 * | 5/2000 | (WO) . |

OTHER PUBLICATIONS

P.F. Fox, "Developments in Dairy Chemistry", Elsevier Applied Science, vol. 4, pp. 26–27, 1989.

S. T. Dybing, *Effect of whey protein incorporation into Cheddar cheese using ultrafiltration techniques on product yield, body, and texture*, vols. I and II, pp. 126–128 (1994).

* cited by examiner

*Primary Examiner*—Milton Cano
(74) *Attorney, Agent, or Firm*—Knobbe, Martens, Olson & Bear LLP

(57) ABSTRACT

The invention relates to a simplified, rapid method which is suitable for making a variety of cheese and cheese products, including natural and processed cheese, in a single installation with common equipment. In particular, the invention concerns a method of making cheese, comprising the steps of: (a) concentrating milk or a reconstituted dry milk, having its pH adjusted to about 5.0 to 6.8, by ultrafiltration and diafiltration to produce a retentate; (b) supplementing said retentate with a protein concentrate or isolate and, optionally, fat and/or flavor; and (c) heating the mixture to produce a smooth consistency.

29 Claims, 1 Drawing Sheet

PROCESS FOR MAKING CHEESE AND CHEESE PRODUCTS

METHODS FOR PRODUCING CHEESE AND CHEESE PRODUCTS

This Application claims the benefit of U.S. Provisional Application No. 60/107,359, filed Nov. 6, 1998.

BACKGROUND OF THE INVENTION

1. Field of the Invention

This invention relates to a simplified, rapid method, which is suitable for making a variety of cheeses and cheese products, including natural and processed cheese, in a single installation with common equipment. More specifically, the invention concerns a highly efficient and versatile method for making a variety of cheese and cheese products directly from concentrated milk and other dairy-derived ingredients including dried caseinates, milk protein isolates, and/or milk protein concentrates, and fat from milk, animal, or vegetable-sources.

2. Description of the Related Art

Methods, ingredients and formulations for making natural and processed cheeses by the traditional approach, and related analytical, nutrition and regulatory information are disclosed in "Cheese and Fermented Milk Foods", Vols. I and II, F. V. Kosikowski and V. V. Mistry, 1999. The book titled "Processed Cheese" by V. L. Zehren and D. D. Nusbaum, 1992, describes processed cheese manufacturing, including ingredients, regulations, formulation, processing, packaging and testing. The entire disclosures of these two textbooks are hereby expressly incorporated by reference.

Traditionally, natural and processed cheese, and different styles of cheese within these categories, are made by significantly different processes, using different types of equipment for processing the curd in order to produce cheese with distinctly different physical characteristics. It is an objective of the present invention to provide a method suitable for making a variety of cheese and cheese products with minimal adjustments in the manufacturing technology and equipment.

In the most conventional cheese making processes, the whey proteins of milk, although highly nutritious, are removed from cheese curd in the whey drainage step. Recovery of these whey proteins would improve the efficiency of making cheese and increase yield of cheese. Processed cheese and other pasteurized cheese products use cheese made by conventional means, and, for the most part, also lack the whey protein component from the original milk. Another objective of this invention is to retain the whey proteins in the cheese in order to increase the cheese yield and decrease the by-products from all forms of cheese manufacture.

In order to reduce the by-product stream and improve cheese yield, the cheese and cheese products should retain all or most of the fat, casein, minerals, whey proteins, and as much of the lactose as possible from the milk and milk-derived ingredients. There are three common ways known to recover the whey proteins in the traditional cheese making process.

One way to incorporate whey proteins into cheese has been to collect the soluble whey proteins that are removed from the cheese curd in conventional processing, and apply a heat treatment to aggregate these proteins in a controlled fashion. These aggregates are then added to the next batch of cheese ingredients and incorporated into the cheese by virtue of their being trapped in the cheese matrix. An example of this is provided in U.S. Pat. No. 4,271,201 (Steinne, 1981) which describes a cheese making processes with bacterial cultures and coagulant enzymes used to incorporate separately treated whey protein aggregates into cheese. It is a further object of this invention to incorporate whey proteins, but by a method that does not involve separate isolation of whey proteins and does not involve bacterial cultures and coagulating enzymes, which results in a continuous cycle of whey protein in the by-product stream.

A second way to incorporate whey proteins into cheese has been to concentrate the proteins, or the protein and fat components of milk, using membrane filtration processes, and then produce cheese from this concentrate. There is less protein in the by-products because there is a smaller volume of whey drained from the cheese and because the soluble whey proteins are at a higher concentration in the water phase of the resulting cheese. Examples of this type of approach are U.S. Pat. No. 3,914,435 (Maubois et al, 1975); U.S. Pat. No. 4,205,090 (Maubois et al, 1980); U.S. Pat. No. 4,355,048 (Shaap et al, 1982); U.S. Pat. No. 4,379,170 (Hettinga et al, 1983); U.S. Pat. No. 4,965,078 (VanLeeuwen et al, 1990); and U. S. Pat. No. 5,356,639 (Jameson and Sutherland, 1994). All of these patents describe processes that utilize bacterial cultures to lower the pH of the concentrate, or an enzyme coagulant to produce the texture required for making cheese. It is yet another object of this invention to produce cheese by utilizing membrane processing for concentrating the proteins and fat of milk but without the need to utilize bacterial cultures or rennet or other enzyme coagulants to produce the desired texture and functionality of cheese.

A third way to incorporate whey proteins into cheese has been to apply a heat treatment or an alkali and heat treatment to the milk-based ingredients in order to cause an association of the whey proteins with the casein proteins. In the subsequent cheesemaking process, the whey proteins are incorporated into the cheese matrix, which matrix in conventional cheesemaking is a casein protein matrix. An example of this approach is U.S. Pat. No. 4,713,254 (Childs and Rajagopalan, 1987).

Conventional cheese making to produce firm or hard cheese utilizes microbial cultures to convert lactose to lactic acid, thus lowering the pH of the cheese relative to the pH of the milk. The culture growth rate is slow enough to produce an evenly distributed hydrogen ion concentration and to avoid localized pH levels that would adversely precipitate the milk proteins and form non-interactive aggregates that will not produce a continuous matrix of the protein, fat, water, minerals, etc. conventionally known as cheese. It is an object of this invention to rapidly and effectively use direct acidification, that is, adding acids to the milk and cheese ingredients in a fashion that avoids variations of a biological origin, such as, changes in enzyme activity during storage, changes in microbial growth rates due to variations in solids and substrate concentrations, changes in pH, and changes in the levels of microbial inhibitors like bacterial phage.

Adjustment of the pH of milk or milk concentrates with organic and inorganic acids is common in the preparation of high moisture cheeses (such as cottage, ricotta, or cream cheese) and in the preparation of relatively high moisture fresh or unripened cheeses such as queso blanco—see Kosikowski and Mistry, Vol. I pages 140–141, Cottage Cheese; Vol. II, pages 64–69, Mozzarella; pages 56-58, Queso Blanco; and pages 72–73, 79, Ricotta for a general description of processing to make these types of cheese. U.S. Pat. No. 4,689,234 (Ernstrom and Brown, 1987) describes a process and apparatus for the production of cheese using ultrafiltration and diafiltration, treating the retentate with an acid, an acid pre-cursor, or a lactic acid-producing starter culture, fermenting, and adding a coagulant enzyme (rennet) to produce curds. The curds are treated to remove moisture, drained, salted, and pressed to obtain the final product. A process for making cottage cheese by direct acidification is described in U.S. Pat. No. 4,066,791 (Corbin, 1978). Direct acidification has also been utilized in the preparation of cheese from ultrafiltered milk. U.S. Pat. No. 4,018,752 (Buhler, 1977). U.S. Pat. No. 4,959,229 (Reddy et al., 1990) describes the preparation of cheese by pre-conditioning milk by lowering the pH to between 6 and 6.6, heat treating, cooling, lowering the pH to between 5 and 6 by direct acidification, inoculating the mix with conventional cheese making bacterial cultures, and treating with a coagulating agent to form a curd which is then treated as in conventional cheese making to produce cheese and a whey by-product. U.S. Pat. No. 5,006,349 (Dahlstrom, 1991) describes the production of a soft cheddar or American-type cheese product by adding lactic acid and rennet enzyme to a milk concentrate prepared by ultrafiltration. A direct acidification step is also described in U.S. Pat. No. 5,130,148 (Brown and Hunt, 1992).

Direct acidification of retentates for cheese base manufacture is also described in the Ph.D. thesis of S. T. Dybing, 1994 (Effect of Whey Protein Incorporation Into Cheddar Cheese Using Ultrafiltration Techniques on Product Yield, Body, and Texture. Volume I, page 127, University Microfilms International, 1994).

These prior art disclosures of direct acidification used to make firm and hard cheeses use coagulating enzymes to form a curd, employ whey drainage, treat curds in lengthy, conventional processing steps, require maturation for flavor development, and are applied to making only one type of cheese. It is a further object of this invention to utilize direct acidification as a rapid process for pH adjustment in conjunction with membrane processing, dry milk ingredient additions, and a single, simple process technique to prepare a variety of cheese types with a variety of functional, physical, and flavor attributes provided primarily by the selection and levels of selected ingredients.

U.S. Pat. No. 5,554,397 (Tanaka and Sueyasu, 1996) describes a process for making processed cheese wherein milk is concentrated by ultrafiltration and diafiltration to produce a composition with the solids in the same proportion as the solids in the final cheese. The retentate is acidified by either bacterial fermentation or by direct acidification with lactic acid and treated with a coagulating enzyme prior to drying. The dried milk product is combined with sodium phosphate (emulsifying salt) and reconstituted in enough water to provide the moisture content of the desired cheese product. The mixture is melted by heating, and flavor, color, and salt are added prior to forming and packaging. An alternative process uses guar and xanthan gums to produce the gelled texture of the processed cheese instead of using the coagulating enzyme treatment. It is an object of this invention to produce the desired texture of semi-hard and hard cheeses and their processed cheese derivatives without the need to employ a coagulating enzyme treatment with all of the milk-derived ingredients, without preparing a milk concentrate with solids in the same proportion as the final cheese, and without the need to use emulsifying salts or non-dairy thickeners to produce the structural and functional properties of a variety of cheese and cheese products.

The structure and physical properties of many types of cheese, mozzarella and cheddar being two examples, are imparted by coagulation of the milk proteins using rennet or other coagulating enzymes. The enzyme treatment of milk modifies kappa casein and produces a coagulum in the presence of calcium ions. This coagulum can be cut and worked by various means to produce the desired structure and function in the cheese. P. F. Fox, in "Developments in Dairy Chemistry", Vol. 4, page 27, 1989, reports that, in typical cheese, an average of 85% of the kappa casein will have been hydrolyzed by the coagulating enzyme. An unexpected benefit of this invention in that the action of coagulating enzymes to modify a major portion of the kappa casein causing aggregation or coagulation is not required. It is an object of this invention to reduce or eliminate the enzyme coagulation step in making cheese thus saving time and minimizing the variation caused by the changes in pH, calcium ion concentration, and enzyme activity. Where a low level of the enzyme rennet was used in the practice of this invention, less than about one-third of the cheese casein was exposed to the enzyme, no coagulation was observed, and the enzyme was denatured prior to packaging the cheese product so as to be inactive during storage of the cheese. Tanaka and Sueyasu (U.S. Pat. 5,554,397 above) describe making cheese without rennet coagulation, but the desired structure was obtained using quar and xanthan gums. It is a further object of this invention to make products that look like and function like cheese without the need to incorporate gums, starches, thickeners, or other structure forming additives into the composition.

SUMMARY OF THE INVENTION

The present invention concerns a new and improved method for making cheese and cheese products.

More specifically, the present invention concerns a method of making cheese, comprising the steps of: (a) concentrate milk, or a reconstituted milk, having its pH adjusted to about 5.0 to 6.8, by ultrafiltration and diafiltration to produce a retentate; (b) supplementing the retentate with a protein concentrate or isolate and optional fat and/or flavor; and (c) heating the mixture obtained to produce a smooth consistency.

In a particular embodiment, the method is performed without the use of a coagulating enzyme.

In another embodiment, the method is performed without the use of an emulsifying salt or non-dairy thickener.

In a further embodiment, the method is performed without the use of milk fermenting bacteria.

In a preferred embodiment of the invention, at least a portion of the retentate is retained as a fluid.

In another preferred embodiment, the composition and amount of said milk protein is chosen to provide a desired cheese or cheese product.

In another preferred embodiment, the amount of the milk protein added to the retentate is chosen to provide a cheese composition with about 1.5 to 4.0 parts of protein per ten parts of cheese.

The method of the invention may include the addition of a caseinate to the retentate. Preferably, the proportion of cheese protein contributed by the caseinate supplement is adjusted to a value optimal for the desired cheese end product.

The method disclosed herein may also include the addition of a milk fat to the retentate, which may, for example, be cream, plastic cream, butter, anhydrous milk fat, or fat contributed by the protein supplement.

The method may include additional steps, depending on the class and character of the desired end product of enzyme modified cheese.

DETAILED DESCRIPTION OF THE PREFERRED EMBODIMENT

Definitions

Figure 1:
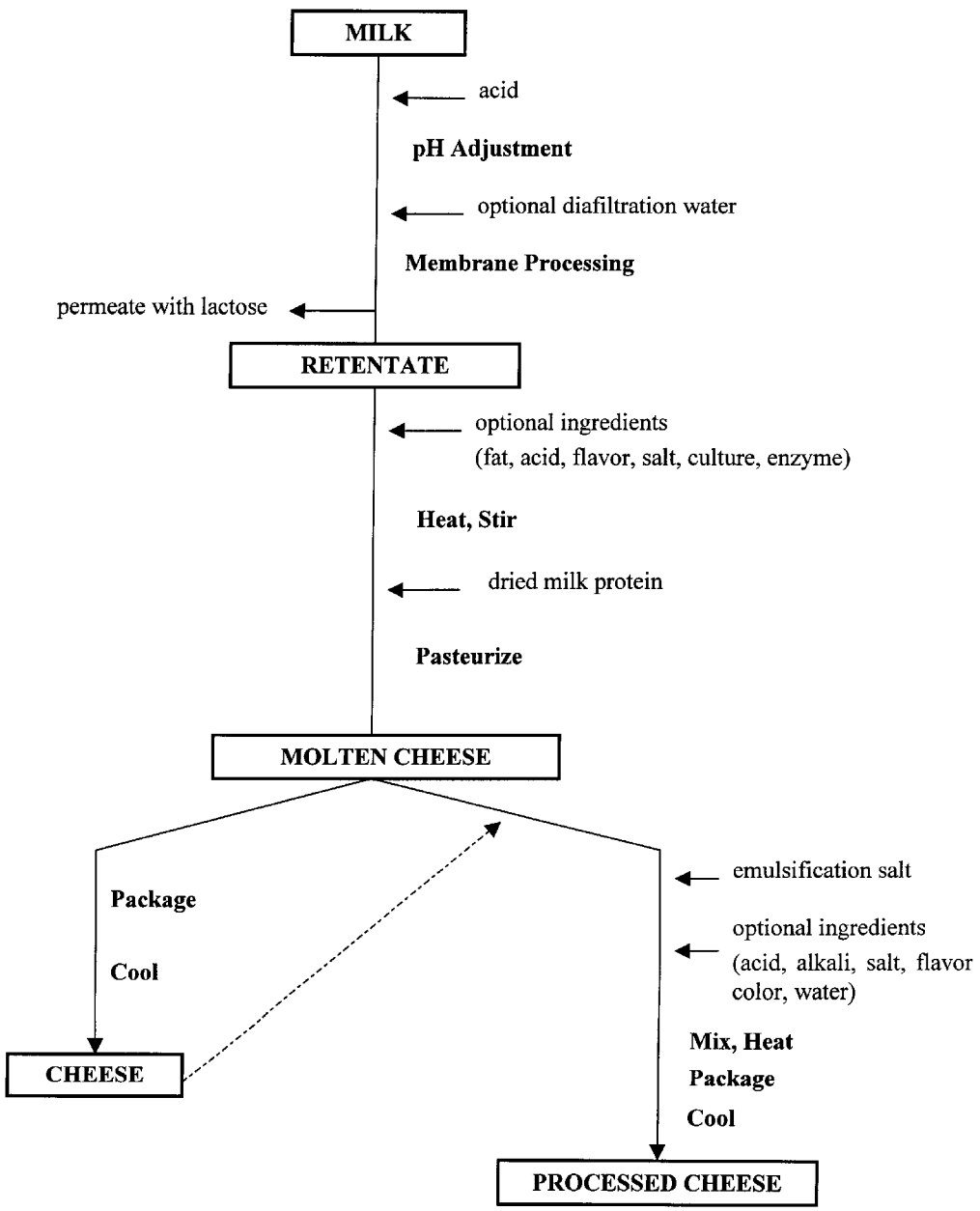
FIG. 1 is a chart illustrating a typical process for making cheese by the method of the invention.

The book, "Cheese and Fermented Milk Foods", Volumes I and II, by F. V. Kosikowski and V. V. Mistry, 1999, describes ingredients, formulations, and process techniques for making cheese and processed cheeses and describes their composition, analysis, nutrition, by-products, and applicable regulations. The book titled "Processed Cheese" by V. L. Zehren and D. D. Nusbaum, 1992, describes processed cheese manufacturing, including ingredients, regulations, formulation, processing, packaging, and testing. These two textbooks describe the technology and art for the conventional cheese and processed cheese manufacture. Unless otherwise noted, the terms of cheese making technology are used for their conventional meaning, as described, for example, in the textbooks referenced herein.

"Cheese" is the ripened or unripened, soft, semi-hard, hard, or extra hard product made, at least in part, from milk and milk-derived ingredients and having the following moisture content and firmness characteristics.

TABLE 1

Cheese Descriptions
Designation according to firmness and ripening characteristics.

According to firmness: Term I

| MFFB %* | Designation | According to principal ripening: Term 2 |
|---|---|---|
| <51 | Extra hard | Ripened |
| 49–56 | Hard | Mould ripened |
| 54–69 | Firm/Semi-hard | Unripened/Fresh |
| >67 | Soft | In Brine |

*MFFB means Moisture on a Fat Free Basis.

Taken from CODEX Standard for Cheese, CODEX-STANDARD A-6 (1999)

"Milk" is the lacteal secretion obtained from mammals, preferably cattle, and more preferably bovine species. The term is meant to include lacteal secretions with the composition adjusted by means of either removing components, such as fat, or adding components, such as protein, fat, carbohydrate, etc. Furthermore, the term is meant to include acidified milk, cultured milk, concentrated milk, condensed milk, evaporated milk, and reconstituted dry milk products.

"Milk-derived ingredients" are components from milk obtained by physical or chemical separation techniques and which may have been further modified by processing techniques known to those skilled in that art. This term includes, but is not limited to, cream, butter, anhydrous milkfat, lactose, whey, milk minerals, enzyme modified cheese flavor, and milk proteins including, but not limited to: casein, caseinates, milk protein isolates, milk protein concentrates, whey protein concentrates, and milk protein hydrolysates.

"Milk protein concentrate" is the dried composition from milk with the proportion of solids derived from protein increased relative to the proportion of solids derived from protein in milk. Commercial products are made using membrane filtration techniques or by combining precipitated proteins, like casein, with milk or whey either before or after drying. The fat content of the composition is not intended to be a limitation, in that any portion of solids may be derived from lipids.

"Cheese products" is meant to include pasteurized process cheese, pasteurized processed cheese food, and pasteurized processed cheese spread, each of which could include fruits, vegetables, or meats. These products are further described in the U.S. Code of Federal Regulations 21 CFR 133.167 through 133.180, but this is not offered as a limitation on the products made by the process described herein.

"Membrane filtration" is meant to mean the process by which a semi-permeable membrane is used to separate components of a mixture on the basis of their physical or molecular size. This term includes ultrafiltration, microfiltration, and nanofiltration which utilize semi-permeable membranes having different porosity characteristics. This term is also meant to include diafiltration, a membrane process using water or other media for washing the membrane retained materials and further reducing the amount of membrane permeable components in the retained material.

"Coagulation enzyme" is meant to mean the class of proteinase enzymes used by those skilled in the art of cheesemaking to produce a coagulum from milk and milk-derived ingredients as one of the steps in producing cheese and cheese products. Chymosin (EC 3.4.24.4), usually called rennet, is an example of one of the enzymes used for this purpose.

Modes of Carrying out the Invention

In the method of the present invention, a starting material is pasteurized whole milk or pasteurized skim milk or, preferably, pasteurized milk adjusted to a pH in the range of 5.0 to 6.8, preferably, 5.0 to 6.5, more preferably, 5.5 to 6.5. The milk is concentrated four- to eight-fold by ultrafiltration and diafiltration to recover protein, fat, minerals, etc. as a retentate. Ultrafiltration and diafiltration use a semi-permeable membrane filter, preferably with a 10,000 to 100,000 molecular weight cut-off and more preferably with a 10,000 to 30,000 molecular weight cut-off membrane. The preferred fat in the final cheese or cheese product composition is fat retained from the starting milk, plus, if needed, preferred fats added to the retentate including cream, plastic cream, butter, anhydrous milkfat and/or fat contributed by a milk protein ingredient which are added to provide greater than about one part of fat per ten parts of cheese. Certain low fat cheeses and cheese products do not require the addition of extra fat. In another preferred embodiment, milk fat is added to the retentate as a low moisture concentrate of milk protein and milk fat. The protein to be added to the retentate is a low moisture, preferably dried, protein concentrate or protein isolate from an animal or plant source added to provide the cheese composition with approximately 1.5 to 4.0 parts of protein per ten parts of cheese or more preferably a total of 2.5 to 3.0 parts of protein per ten parts of cheese. Selection of the preferred protein to be added depends on the characteristics to be obtained in the final product. Dried milk protein concentrates are preferred for making cheddar type cheeses and calcium caseinate or milk protein isolates are preferred for mozzarella type cheese. As plant derived protein additives, for example soy proteins may be used. Other preferred ingredients include organic and inorganic acids, especially citric acid or lactic acid, for adjusting the pH of the composition without precipitating, aggregating, coagulating, or gelling the proteins; sodium chloride and, optionally, emulsifying salts used in process cheese manufacture, especially sodium citrate or sodium phosphate.

The main benefits of this technology over current art can be summarized as follows: 1) bacterial fermentation is not required to obtain the optimal pH or consistency of desired cheese or cheese product; 2) a milk coagulating enzyme, such as rennet, is not required or can be used as an optional ingredient for treating a minor portion of the milk protein; 3) the process is rapid and takes less than about 30 minutes from making the first blend with concentrated milk retentate to the point of packaging of the molten cheese; 4) both process and product variability are minimized without variations caused by changes in the biologic properties of either the ingredients or the finished products; 5) multiple cheese varieties can be manufactured in a single installation with common equipment; 6) the pasteurized cheese products have a beneficial shelf-life advantage in that there is little change in texture, flavor, or other physical attributes over time; 7) processed cheese can be made without prior production of cheese ingredients which required separate manufacturing facilities and which must be stored and re-worked into a processed cheese; and 8) cheese and cheese products can be made from milk either by batch or by a continuous process.

The method of the invention is suitable for producing a variety of cheeses and cheese products, such as natural and processed cheeses, and cheese products with the attributes of matured or aged cheese. The pasteurized cheese and cheese products obtained do not significantly change in their physical, textual, and flavor attributes during long periods of storage. Natural mozzarella, for instance, does not have all of the desired characteristics immediately after production. The melt and stretch characteristics develop over a period of three to six weeks, and three to four months after mozzarella is made, the melt and stretch characteristics diminish as the cheese matures. Natural cheddar cheese also develops its flavor through slow biological and chemical changes during maturation which may take from three to eighteen months. The process of this invention utilizes a heat treatment step to stop enzyme activity through denaturation and to stop microbial growth during storage, resulting in an improved stability of the cheese and cheese products produced.

Different cheese types, such as mozzarella and cheddar, use significantly different processes and use different types of equipment for processing the curd in order to produce cheese with distinctly different physical characteristics. In making cheddar, the cheese curd is drained, sliced, and stacked (cheddared). The cheese slabs are milled, salted, hooped, and pressed to form a block. Mozzarella curds have a different composition than cheddar curds, and after draining the whey the curd is washed, cooled, formed into blocks, and ripened for a period of time before a hot water processing step during which the mozzarella block is partially melted and stretched to provide the textural characteristic of mozzarella.

Simple, compact, readily available equipment has been used in this invention to produce a variety of cheeses by the process of this invention. A water jacketed vessel equipped with a mixing device or a twin-screw, jacketed, process cheese cooker with direct steam injection have been used to prepare the cheeses in the examples described below. Those trained in the art will recognize that other equipment suitable for use in making processed cheese can likewise be used for making the variety of cheeses described herein. Neither the equipment nor the variety of cheeses described are intended to limit the scope of this invention.

In general, processed cheese is a blend of selected young and matured cheeses that are melted to form a homogeneous mix which is then further processed to form blocks or individual slices or filled into tubs used to make sauces and spreads. Processed cheese and other cheese products are generally produced from cheese as an ingredient. The method of the present invention is equally suitable for making processed cheese and other cheese products using the same simple equipment described herein for making cheese. Since this process produces a molten cheese mass and a molten cheese mass is one of the first steps of making processed cheese and cheese products, it is evident that the process of this invention can easily be modified by adding other ingredients to the molten mass or by adding additional processing sequences to produce blocks, spreads, and pre-formed slices.

Further details of the invention are illustrated by the following, non-limiting Examples.

EXAMPLE 1

Cheddar cheese manufacture began when the pH of 60 gallons of pasteurized milk was adjusted to 6.0 with lactic acid (40% solution) at 5° C. The acidified milk was held quiescently for 45 minutes, heated to 50° C. with a plate heat exchanger, and processed by ultrafiltration to a volume concentration ratio of 4× in a unit containing membranes with a molecular weight cutoff of 10,000. Continuous diafiltration then commenced with the addition of approximately 0.9 parts of water to one part of retentate and the subsequent removal of 0.9 parts of permeate. Ultrafiltration continued until the retentate was concentrated to a volume concentration ratio of 5×. The combined membrane processing was designed to produce a finished cheese with a lactose content of approximately 2%. The finished retentate was collected, cooled to 5° C., and held until cheese manufacture.

Cheddar cheese manufacture was continued when 22 g of the 5× retentate was combined with 34 g of cream (36% milk fat). The pH of the mixture was adjusted to 5.0 by the addition of 1 mL of Lactic acid (40% solution). The treated retentate was supplemented with 1.7 g of salt (NaCl) and 2.5 micro liters of single strength Sur-curd™ (Gist-brocades International B.V., Menomonee Falls, Wis.). The mixture was held quiescently for 2.5 hours while allowing the temperature to rise to 21° C. A coagulum did not form during these treatments. The mixture was supplemented with 0.1 g of starter culture (prepared in a medium of skim milk) and heated to 50° C. Then 21 g of unsalted butter was added to the treated retentate, melted, and blended into the mixture. The cheese mix was heated to 42° C. and 0.5 g of dried buttermilk added. When the temperature of the mixture reached 50° C., 19 g of dried milk protein concentrate [ALAPRO™ 4850, NZMP (North America) Inc., Santa Rosa, Calif.] was added. The cheese blend was heated to 66° C and 6.5 g of a blend of enzyme modified cheeses [ALACO™ 9550, NZMP (North America), Key Ingredients, Inc. Hummelstown, Penn.] added to the mix, and the pH was adjusted to 5.2 by the addition of 0.4 mL of lactic acid (40% solution). The temperature was increased to 80° C, the cheese blend mixed for 2 minutes, and the molten plastic mass packaged in a plastic overwrap for refrigerated storage. The flavor, body, and texture of the product matched or exceeded the typical commercial specifications for Cheddar cheese. The addition of bacterial starter culture and the casein coagulating enzyme were for the purpose of satisfying the conventional and legal requirements for labeling this product as Cheddar cheese. The amounts of these components added and the temperatures immediately achieved in product manufacture did not allow appreciable bacterial fermentation or enzymatically catalyzed coagulation of the mix.

EXAMPLE 2

Process American cheese was produced with the Cheddar cheese made in Example 1. Initially, 96 g of the Cheddar cheese made in Example 1 were ground into particles suitable for the manufacture of process cheese. Then 16 g of the ground cheese were heated to 40° C. and then combined with another 40 g of the ground Cheddar cheese. The treatment produced a semimelted mass to which the remaining 40 g of the Cheddar cheese, 1.5 g of unsalted butter, and 1 g of trisodium citrate were added. The mixture was heated to 64° C., the pH adjusted to 5.70 by the addition of 0.5 mL of citric acid (1 M), and another 1 g of trisodium citrate. The mixture was heated to 70° C. and the pH adjusted to 5.6 with citric acid. The mixture was heated to 74° C. and 0.5 g of salt (NaCl) added. The process cheese was heated to 80° C., mixed for 2 minutes, and then the molten mass was packaged in a plastic overwrap. Experienced graders determined that the flavor, body, and texture of finished cheese equaled or exceeded the specifications outlined by Zehren and Nusbaum for commercially prepared individually wrapped process American cheese.

EXAMPLE 3

Process American cheese was produced when 60 gallons of pasteurized milk was processed to produce a retentate with a volume concentration ratio of 5× as described for Example 1. The finished retentate was collected, cooled to 5° C., and held until cheese manufacture.

Cheddar cheese manufacture continued when 21 g of the 5× retentate was combined with 36 g of cream (36% milk fat). The pH of the mixture was adjusted to 4.2 by the addition of 1 mL of citric acid (1 M). The treated retentate was supplemented with 0.1 g of cheese starter culture (prepared in a medium of skim milk) and 2.5 micro liters of single strength Sur-curd™ (Gist-brocades International B.V., Menomonee Falls, Wis.). This treatment did not produce a coagulum. The mixture was held quiescently for 2.5 hours while allowing the temperature to rise to 21° C. The mixture was heated to 66° C. and enriched with 21 g of a dried, high-fat milk protein concentrate, a powder containing 41% milk fat, and 50% protein [Dairy Research Institute, Palmerston North, New Zealand]. Immediately thereafter, 6.5 g of enzyme modified cheese [ALACO™ 9550, NZMP (North America), Key Ingredients, Inc. Hummelstown, Penn.], 1.7 g of salt, and 2 g of sodium phosphate emulsifying salts were added to the mixture. The pH of the mixture was adjusted to 5.8 with lactic acid (40% strength) and the mixture heated to 80° C. The cheese blend was mixed for 2 minutes and the product packaged in a plastic overwrap for refrigerated storage. Experienced graders determined that the flavor, body, and texture of finished cheese equaled or exceeded the specifications outlined by Zehren and Nusbaum for commercially prepared individually wrapped process American cheese. The addition of bacterial starter culture and the casein coagulating enzyme are for the purpose of satisfying the conventional and legal requirements for labeling this product as Cheddar cheese. The amounts of these components added and the temperatures immediately achieved in product manufacture do not allow appreciable bacterial fermentation or enzymatically catalyzed coagulation of the mix. Those skilled in the art of cheese manufacture will recognize that the mixture just prior to the addition of sodium phosphate is cheese and that the mixture just after the addition of the phosphate salt is processed cheese. The example further demonstrates the utilization of a simple, rapid process for making process cheese without first producing, storing, and maturing cheese in the conventional manner.

EXAMPLE 4

Process American cheese was produced when 60 gallons of pasteurized milk was processed to produce a retentate with a volume concentration ratio of 5× as described for Example 1. The finished retentate was collected, cooled to 5° C, and held until cheese manufacture.

Cheddar cheese manufacture was continued when 22 g of the 5× retentate was combined with 34 g of cream (36% milk fat). The pH of the mixture was adjusted to 4.6 by the addition of 1 mL of citric acid (1 M). The treated retentate was supplemented with 0.1 g of cheese starter culture (prepared in a medium of skim milk) and 2.5 micro liters of single strength Sur-curd™ (Gist-brocades International B.V., Menomonee Falls, Wis.). The mixture was held quiescently for 2.5 hours while allowing the temperature to rise to 21° C. The mixture was heated to 41° C. and 21 g of unsalted butter added, melted, and blended into the mixture. The cheese mix was heated to 46° C. and 0.5 g of dried buttermilk added. Then 19 g of dried milk protein concentrate [ALAPRO™ 4850, NZMP (North America) Inc., Santa Rosa, Calif.] was added to the mixture when the temperature of the mixture reached 50° C. Additional heating increased the temperature to 66° C. and 6.5 g of a blend of enzyme modified cheeses [ALACO™ 9550, NZMP (North America), Key Ingredients, Inc. Hummelstown, Penn.] and 1.7 g of salt (NaCl) were added to the mix. Then 2.0 g of trisodium citrate was added to the mix and the pH adjusted to 5.9 with 0.5 mL of citric acid (1 M). The temperature was increased to 80° C., the cheese blend mixed for 2 minutes, and the product packaged in a plastic overwrap for refrigerated storage. Experienced graders determined that the flavor, body, and texture of finished cheese equaled or exceeded the specifications outlined by Zehren and Nusbaum for commercially prepared individually wrapped process American cheese. The addition of bacterial starter culture and the casein coagulating enzyme are for the purpose of satisfying the conventional and legal requirements for labeling this product as Cheddar cheese. The amounts of these components added and the temperatures immediately achieved in product manufacture do not allow appreciable bacterial fermentation or enzymatically catalyzed coagulation of the mix.

EXAMPLE 5

Process American cheese was produced when 60 gallons of pasteurized milk was processed to produce a retentate with a volume concentration ratio of 5× as described for Example 1. The finished retentate was collected, cooled to 5° C., and held until cheese manufacture.

Cheddar cheese manufacture was continued when 22 g of the 5× retentate was combined with 34 g of cream (36% milk fat). The pH of the mixture was adjusted from to 4.5 by the addition of 1 mL of lactic acid (40% solution). The treated retentate was supplemented with 0.1 g of cheese starter culture (prepared in a medium of skim milk) and 2.5 micro liters of single strength Sur-curd™ (Gist-brocades International B.V., Menomonee Falls, Wis.). The treatment did not produce a coagulum. The mixture was heated to 41° C. and 21 g of unsalted butter added, melted, and blended into the mixture. Then 0.5 g of dried buttermilk was added to the cheese mix at 40° C. When the heat treatment increased the temperature to 57° C., 1.0 g of sodium phosphate salts were added to the mix. Then 19 g of dried, alkali treated milk protein isolate [NZMP (North America) Inc., Santa Rosa, Calif.] was added to the mixture.

The milk protein isolate of this example was prepared by adjusting the pH of skim milk to 7.5 with NaOH (2N), heating the mix to 85° C., and maintaining this temperature for about 5 minutes to create an association of the soluble whey proteins with the casein in the milk. The milk was then cooled to 25° C. and the pH adjusted to 6.8 with sulfuric acid (0.5 M). Ultrafiltration and diafiltration were then performed by the procedures similar to those described in Example 1, producing a retentate with less than 2% lactose. The retentate was dried in a conventional spray drier to a moisture content of about 4%.

An additional 1.0 g of sodium phosphate salts was added to the mix and the mix heated to 59° C. The pH of the mix was adjusted to 5.6 with 1 mL of lactic acid (40% solution) while the cheese flavored with 6.5 g of enzyme modified cheese [ALACO™ 9550, NZMP (North America), Key Ingredients, Inc. Hummelstown, Penn.] and 1.7 g of salt (NaCl). The temperature was increased to 80° C., the cheese blend mixed for 2 minutes, and the product packaged in a plastic overwrap for refrigerated storage. Experienced graders determined that the flavor, body, and texture of finished cheese equaled or exceeded the specifications outlined by Zehren and Nusbaum for commercially prepared individually wrapped process American cheese. The addition of bacterial starter culture and the casein coagulating enzyme are for the purpose of satisfying the conventional and legal requirements for labeling this product as Cheddar cheese. The amounts of these components added and the temperatures immediately achieved in product manufacture do not allow appreciable bacterial fermentation or enzymatically catalyzed coagulation of the mix.

EXAMPLE 6

The manufacture of a process American-type cheese began when raw whole milk was separated, standardized to a fat content of 3.7% and a fat-to-protein ratio of 1.2, and then pasteurized at 73° C. for 16 seconds. The pasteurized milk was cooled to 5° C. and sufficient lactic acid (20% solution) added to adjust the pH to 6.0. The acidified milk was held quiescently for 45 minutes, heated to 50° C. with a plate heat exchanger, and processed by ultrafiltration to a volume concentration ratio of 4× in a unit containing membranes with a molecular weight cutoff of 10,000. Ultrafiltration with diafiltration proceeded as described in Example 1 to produce a retentate with a volume concentration ratio of 5×. The finished retentate was collected, cooled to 5° C., and held until cheese manufacture.

Cheese manufacture continued when 60 kg of the 5× ultrafiltration retentate and 9.75 kg of enzyme modified cheese [ALACO™ 9550, NZMP (North America), Key Ingredients, Inc. Hummelstown, Penn.] were blended together in a suitably sized twin screw process cheese cooker (Rietz, 226 kg capacity). The pH of the blend was adjusted from 6.0 to 4.6 by the addition of 3.15 L of lactic acid (44% solution) with agitation. The cheese mix was then supplemented by the addition of 3 kg of sodium phosphate salts. The cheese mix was heated to 55° C. by direct steam injection and 43 kg of salted butter added. The temperature of the ingredients in the cooker was sufficient to melt the butter and the agitation incorporated the liquid milk fat into the cheese mixture. Then 25 kg of a dried milk protein concentrate with 85% protein (dry basis) [ALAPRO™ 4850, NZMP (North America), Santa Rosa, Calif.] was blended into the cheese mix, increasing the pH of the mix to 5.9. The pH of the mix was adjusted to 5.4 by the addition of 1.2 L of lactic acid (44% solution) and the mix heated to 75° C. Finally, 2.4 kg of salt (NaCl) was added, the temperature increased to 86° C., and the cheese blend mixed for 2 minutes to produce a smooth product. The product was packaged as individually wrapped slices and stored at refrigeration temperatures. The composition of the cheese and the various ingredients is presented in Table 1.

TABLE 1

Composition of the milk, retentates, ALAPRO ™ 4850, and processed cheese produced in Example 6.

| Component | Moisture | Total Solids | Fat | Protein | Ash | Lactose | Calcium |
|---|---|---|---|---|---|---|---|
| | ---%--- | | | | | | Mmole/kg |
| Milk | 88.0 | 12.0 | 3.5 | 3.25 | 0.72 | 4.50 | 28.8 |
| 4× Retentate (before DF) | 71.7 | 28.3 | 12.5 | 11.04 | 1.09 | 3.67 | 65.3 |
| 4× Retentate (after DF) | 73.4 | 26.6 | na | 11.36 | 0.80 | na | 58.6 |
| 5× Retentate | 57.9 | 42.1 | 21.0 | 18.31 | 1.20 | 1.59 | 92.1 |
| ALAPRO ™ | 2.8 | 97.2 | 1.5 | 84.7 | 7.3 | 3.7 | na |
| Cheese | 40.6 | 59.4 | 30.5 | 21.1 | 5.4 | 2.5 | 145 |

Experienced graders determined that the flavor, body, and texture of finished cheese equaled or exceeded the specifications outlined by Zehren and Nusbaum for commercially prepared individually wrapped process American cheese.

EXAMPLE 7

Process American cheese food was produced as described in Example 6, but with enough additional water to produce a finished product with a moisture content of 44%. This product also was packaged as individually wrapped slices and stored at refrigeration temperatures. The composition of the cheese is presented in Table 2.

TABLE 2

Composition of the processed cheese food produced in Example 7.

| Component | Moisture | Total Solids | Fat | Protein | Ash | Lactose | Calcium |
|---|---|---|---|---|---|---|---|
| | ---%--- | | | | | | Mmole/kg |
| Cheese | 44.1 | 55.9 | 29.0 | 19.5 | 5.0 | 2.4 | 130 |

Experienced graders determined that the flavor, body, and texture of finished cheese equaled or exceeded the specifications outlined by Zehren and Nusbaum for commercially prepared individually wrapped process American cheese food.

EXAMPLE 8

The manufacture of part skim Mozzarella began when the pH of 60 gallons of pasteurized whole milk at 5° C. was adjusted from 6.7 to 5.2 with lactic acid (40% solution). The acidified milk was held quiescently for 45 minutes. Then the pH of the milk was adjusted to 5.8 with 2 N NaOH and the milk heated to 50° C. The treated milk was processed using an ultrafiltration unit containing membranes with a molecular weight cutoff of 10,000. Ultrafiltration with diafiltration proceeded as described in Example 1 to produce a retentate with a volume concentration ratio of 5×. The finished retentate was collected, cooled to 5° C., and held until cheese manufacture.

Mozzarella manufacture continued when 2.3 kg of the 5× ultrafiltration retentate at 5° C. was adjusted to pH 5.3 by the addition of 15 mL of lactic acid (40% solution). Then 66 g of salt (NaCl) and 0.26 mL of single strength Sur-curd™ (Gist-brocades International B.V., Menomonee Falls, Wis.) diluted to 5 mL with water were added to the retentate, and the mixture quiescently held for 3 hours without producing a coagulum. The temperature of the treated retentate was allowed to rise to 21° C. (room temperature) during the 3 hour holding period. The amount of coagulating enzyme added was not sufficient to produce a casein coagulum in the retentate during this treatment. The retentate was transferred to a suitable twin screw cooker (Blentech, 5.5 kg capacity) and agitation was initiated using the lowest screw speed. Then 300 g of unsalted butter and 850 g of dried milk protein isolate were sequentially added to the retentate in the cooker. The milk protein isolate was a 50:50 blend of a sodium isolate and a calcium isolate [TMP™ 1100 and TMP™ 1380 respectively, from NZMP (North America) Inc., Santa Rosa, Calif.]. The speed of the cooker screws was increased to the medium setting, and the pH of the mix adjusted to approximately 5.4 by the addition of 16 mL lactic acid (40% solution). The temperature of the cheese mix in the cooker was maintained at 32° C. by the addition of 50 g of water as ice and the pH of the mix adjusted to approximately 5.2 by the addition of 16 mL of lactic acid (40% solution). The speed of the cooker screws was increased to the maximum setting, the temperature of the mix increased to 60° C. by direct steam injection, and 75 g of a blend of enzyme modified cheeses with ALACO™ 9550 [NZMP (North America), Key Ingredients, Inc. Hummelstown, Penn.] added for flavor. The temperature was increased to 80° C. and the cheese blend mixed for 2 minutes. The molten, plastic mass was packaged as a single loaf. The product flavor, body, and texture and the ability to grate, melt, and stretch when melted matched or exceeded the typical commercial specifications for Mozzarella cheese.

EXAMPLE 9

The manufacture of part skim Mozzarella began when 60 gallons of pasteurized whole milk was treated as described in Example 1 to produce a retentate with a volume concentration ratio of 5×. The finished retentate was collected, cooled to 5° C., and held until cheese manufacture.

A similar process was used to make Mozzarella as is described in Example 8. The only procedural difference was that the addition of a coagulating enzyme was omitted, thereby eliminating the enzymatic treatment of a minor portion of the casein in the retentate. Mozzarella manufacture continued when 50 g of the 5× ultrafiltration retentate at 5° C. was adjusted to pH 4.5 by the addition of 0.4 mL of lactic acid (40% solution). Then 26.1 g water and 1.2 g of salt (NaCl) were added to the retentate, and the mixture quiescently held for 2 hours. The temperature of the treated retentate was allowed to rise to 21° C. (room temperature) during the 2 hour holding period. The temperature of the retentate was increased to 30° C. with medium agitation and 9.1 g of unsalted butter mixed into the retentate. After the butter had melted and was incorporated into the retentate as an emulsion, then 19.3 g of dried milk protein isolate was added to the retentate. The milk protein isolate was a 50:50 blend of sodium isolate and calcium isolate TMP™ 1100 and TMP™ 1380, respectively [NZMP (North America) Inc., Santa Rosa, Calif.]. The pH of the mix adjusted to approximately 5.4 by the addition of 0.5 mL lactic acid (40% solution) and the temperature of the cheese mix raised to 65° C. Then 1.6 g of a blend of enzyme modified cheese with ALACO™ 9550 [NZMP (North America), Key Ingredients, Inc. Hummelstown, Penn.] was added to the cheese mix, the pH adjusted to 5.0 by the addition of 1 mL of Lactic acid (40% solution), and the cooking temperature increased to 80° C. The molten, plastic mass was packaged in a plastic overwrap for cooling and storage. The product flavor, body, and texture and the ability to grate, melt, and stretch when melted matched or exceeded the typical commercial specifications for Mozzarella cheese.

EXAMPLE 10

A similar process was used to make Mozzarella as is described in Example 9. The only procedural difference was that the dried protein added to the cheese mix was calcium caseinate instead of the milk protein isolate blend.

The manufacture of part skim Mozzarella began when the pH of 60 gallons of pasteurized, homogenized milk at 5° C. was adjusted to 5.4 with lactic acid (40% solution). The acidified milk was held quiescently for 45 minutes. Then the pH of the milk was adjusted to 5.8 with 2 N NaOH and the milk heated to 50° C. The treated milk was processed using an ultrafiltration unit containing membranes with a molecular weight cutoff of 10,000. Ultrafiltration with diafiltration proceeded as described in Example 1 to produce a retentate with a volume concentration ratio of 5×. The finished retentate was collected, cooled to 5° C, and held until cheese manufacture.

Mozzarella manufacture continued when 2.3 kg of the 5× ultrafiltration retentate at 5° C. was adjusted to pH 5.1 by the addition of citric acid (1 M). The treated retentate was held quiescently for 2.5 hours while allowing the temperature to rise to 21° C. The retentate was transferred to a suitable twin screw cooker (Blentech, 5.5 kg capacity). Agitation of the retentate in the cooker was set to a low screw speed and the temperature increased to 33° C. by direct steam injection. Then, 300 g of unsalted butter was added to the mixture in the cooker, melted, and blended into the mixture. The temperature of the cheese mix was adjusted to 28° C. by the addition of 440 g of deionized water and 240 g of ice. Then 850 g of dried calcium caseinate [ALANATE™ 380, NZMP (North America) Inc., Santa Rosa, Calif.] were added to the mix in the cooker. The speed of the cooker screws was increased to the medium setting, and the temperature of the cheese mix in the cooker was increased to 68° C. by direct steam injection. Then, 54 g of salt and 75 g of a blend of enzyme modified cheeses with ALACO™ 9550 [NZMP (North America), Key Ingredients, Inc. Hummelstown, Penn.] added to the cheese mix. The temperature was increased to 80° C., the cheese blend mixed for 2 minutes, and the product was packaged as a single loaf. The product flavor, body, and texture and the ability to grate, melt, and stretch when melted matched or exceeded the typical commercial specifications for Mozzarella cheese.

EXAMPLE 11

The manufacture of part skim Mozzarella began when 60 gallons of pasteurized milk was processed to produce a retentate with a volume concentration ratio of 5× as described in Example 8. The finished retentate was collected, cooled to 5° C., and held until cheese manufacture.

Mozzarella manufacture continued when the pH of 2.3 kg of the 5× ultrafiltration retentate at 5° C. was adjusted to 5.3 by the addition of 15 mL of lactic acid (40%). Then 66 g of salt (NaCl) and 0.26 mL of single strength Sur-curd™ (Gist-brocades International B.V., Menomonee Falls, Wis.) diluted to 5 mL with water were added to the retentate, and the mixture quiescently held for 3 hours. This treatment did not produce a coagulum. The temperature of the treated retentate was allowed to rise to 21° C. The retentate was transferred to a suitable twin screw cooker (Blentech, 5.5 kg capacity). Agitation of the retentate in the cooker was initiated using the lowest screw speed. Then 300 g of unsalted butter and 850 g of dried calcium case mate [ALANATE™ 380, NZMP (North America) Inc., Santa Rosa, Calif.] were sequentially added to the retentate. The speed of the cooker screws was increased to the medium setting, and 50 g of water (as ice) added to the cooker to maintain the cooker temperature at 33° C. The pH of the mix was adjusted to approximately 5.0 by the addition of 37 mL lactic acid (40% solution). The speed of the cooker screws was increased to the maximum setting, the temperature of the mix increased to 66° C. by direct steam injection, and 75 g of a blend of enzyme modified cheeses with ALACO™ 9550 [NZMP (North America), Key Ingredients, Inc. Hummelstown, Penn.] added for flavor. The temperature was increased to 80° C., the cheese blend mixed for 2 minutes, and the molten cheese mass was packaged as a single loaf. The product flavor, body, and texture and the ability to grate, melt, and stretch when melted matched or exceeded the typical commercial specifications for Mozzarella cheese.

EXAMPLE 12

The manufacture of Ricotta cheese began when 60 gallons of pasteurized milk was processed to produce a retentate with a volume concentration ratio of 5× exactly as described for Example 1. The finished retentate was collected, cooled to 5° C., and held until cheese manufacture.

Ricotta manufacture continued when 35 g of the retentate (at 5° C) was combined with 58 g of water at 21° C. and the pH of the mixture adjusted to 5.8 with 0.5 ml of acetic acid (5% solution). The mixture was heated to 50° C. and combined with 5.8 g of whey protein concentrate containing 80% protein [ALACEN™ 840, NZMP (North America), Santa Rosa, Calif.]. The mixture was heated to approximately 85° C. for 10 minutes with agitation and then combined with 1.2 g of salt (NaCl). The mixture was held at 85° C. for another 5 minutes with agitation, and then packaged in a plastic overwrap for refrigerated storage. Experienced graders determined that the product flavor, body, and texture met the specifications for commercial Ricotta.

EXAMPLE 13

The manufacture of cream cheese began when 60 gallons of pasteurized milk was processed to produce a retentate with a volume concentration ratio of 5× as described for Example 1. The finished retentate was collected, cooled to 5° C., and held until cheese manufacture.

Cream cheese manufacture continued when 15 g of the retentate (at 5° C.) was combined with 38 g of water at 21° C. The retentate and water were mixed together and the mixture heated to 38° C. Then 40 g of unsalted butter added to the mixture with agitation. Heat was applied as needed to melt the butter and the agitation maintained as required to completely incorporate the molten milk fat into the retentate as a stable emulsion. Then 5.5 g of milk protein concentrate [ALAPRO™ 4850, NZMP (North America), Santa Rosa, Calif.] was incorporated into the mixture and the pH of the mixture adjusted to 4.5 with lactic acid (40% solution). The mixture was enriched with 1 g of salt (NaCl), held for another 5 minutes with agitation at 40° C., and then packaged in a plastic jar for refrigerated storage. Experienced graders determined that the product flavor, body, and texture met the specifications for commercial cream cheese.

Those skilled in the art of making cheese and cheese products will recognize that the scope of this invention is not limited by the compositions, the specific ingredients used, or the processing conditions in the examples. The variety of cheeses made by this invention includes soft, firm and hard cheese by the definitions provided in the Food Chemical Codex. A variety of milk proteins, or combinations of milk and vegetable proteins, may be substituted for the dried proteins used here. High moisture and low moisture cheese products and high fat and low fat cheese products may be made using formulations and ingredients known to those skilled in the art. A large number of flavoring agents may be substituted for the enzyme modified cheese flavors, with the flavoring agents selected by those skilled in the art based on the desired attributes of the product of this invention. Practice of this invention is not limited to using the style of mixing apparatus described here, and both batch and continuous processing schemes will be obvious to those skilled in the art of making cheese.

All references cited throughout this specification, are hereby expressly incorporated by reference. It will be apparent for those skilled in the art that variations and modifications of the steps, ingredients and parameters disclosed herein are possible without materially changing the outcome of the method. All such modifications and variations are intended to be within the scope of the present invention.

What is claimed is:

1. A method of making cheese, comprising the steps of: (a) concentrating milk or a reconstituted dry milk concentrate, having its pH adjusted to about 5.0 to 6.8, by ultrafiltration and diafiltration to produce a retentate; (b) supplementing said retentate with a protein concentrate or isolate; and (c) heating the mixture obtained to produce a smooth consistency.

2. The method of claim 1 which is performed without the use of a coagulating enzyme.

3. The method of claim 1 which is performed without the use of an emulsifying salt or non-dairy thickener.

4. The method of claim 1 which is performed without the use of fermenting bacteria.

5. The method of claim 1 wherein said milk is standardized pasteurized whole milk or skim milk.

6. The method of claim 5 wherein said pH is adjusted to about 5.5 to 6.5.

7. The method of claim 6 wherein said pH is adjusted by direct acidification with an organic or inorganic acid.

8. The method of claim 7 wherein the pH is adjusted using lactic or citric acid.

9. The method of claim 1 wherein said ultrafiltration is performed using a membrane with of molecular weight cutoff of about 10,000.

10. The method of claim 1 wherein said ultrafiltration is continued until the retentate is concentrated about 4-times relative to the volume of the milk.

11. The method of claim 10 wherein said concentrated retentate is supplemented with water, diafiltered and the permeate is removed.

12. The method of claim 11 wherein said diafiltration is used to limit the lactose content of the retentate to a desired level.

13. The method of claim 11 wherein said diafiltration is followed by ultrafiltration to provide a retentate concentrated about 5-times relative to the volume of the milk or reconstituted milk starting material.

14. The method of claim 1 wherein at least a portion of said retentate is retained as a fluid.

15. The method of claim 1 wherein the composition and amount of said protein concentrate or isolate are chosen to provide a desired cheese or cheese product.

16. The method of claim 15 wherein said protein concentrate or isolate is from an animal or plant source.

17. The method of claim 16 wherein the amount of said protein concentrate or isolate is chosen to provide a cheese composition with about 1.5 to 4.0 parts of protein per ten parts of cheese.

18. The method of claim 17 wherein the amount of said protein concentrate or isolate is chosen to provide a cheese composition with about 2.5 to 3.0 parts of protein per ten parts of cheese.

19. The method of claim 15 further comprising the addition of a caseinate to said retentate.

20. The method of claim 19 wherein said caseinate is calcium caseinate.

21. The method of claim 19 wherein the ratio of said caseinate to said milk protein concentrate or isolate is adjusted to a value optimal for the desired cheese end product.

22. The method of claim 1 further comprising the addition of a milk fat to said retentate.

23. The method of claim 22 wherein said milk fat is selected from the group consisting of cream, plastic cream, butter, anhydrous milk fat, and milk proteins or concentrates containing fat.

24. The method of claim 22 wherein said milk fat is added in an amount to provide greater than about one part of fat per ten parts of cheese in the end product.

25. The method of claim 1 further comprising the step of adding a flavor.

26. The method of claim 25 where said flavor is an enzyme modified cheese.

27. The method of claim 1 further comprising the addition of an emulsifier or salt.

28. The method of claim 1 further comprising the step of cooking the mixture obtained by supplementing the retentate.

29. The method of claim 28 further comprising the step of slicing or packaging.

* * * * *